J. F. HASKINS.
WIRE-BRUSHES
No. 188,132. Patented March 6, 1877.
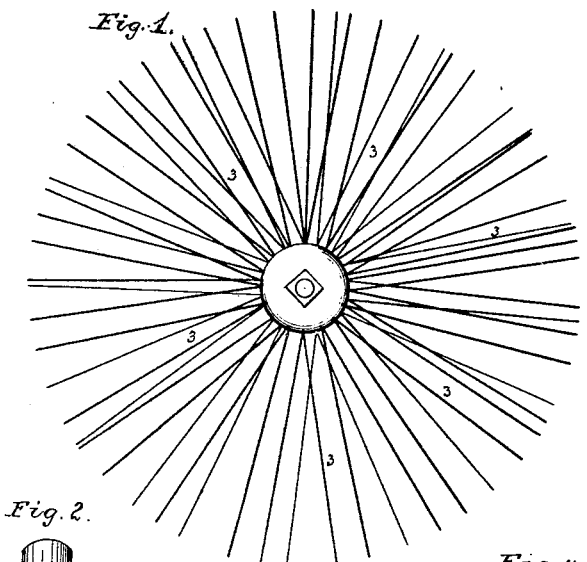
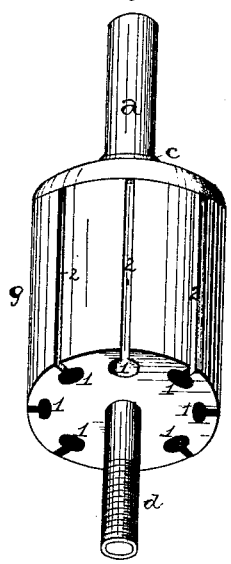
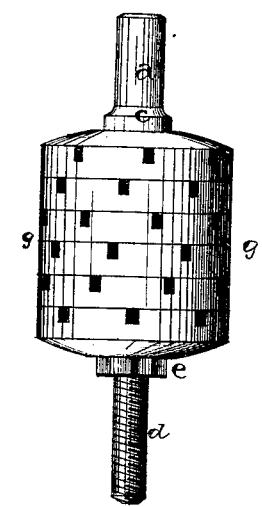
WITNESSES:
J. Wm Garner
F. M. Burnham
INVENTOR:
Jno. F. Haskins
per F. A. Lehmann
Atty.

UNITED STATES PATENT OFFICE.

JOHN F. HASKINS, OF PHILADELPHIA, PENNSYLVANIA.

IMPROVEMENT IN WIRE BRUSHES.

Specification forming part of Letters Patent No. 188,132, dated March 6, 1877; application filed January 31, 1877.

*To all whom it may concern:*

Be it known that I, JOHN F. HASKINS, of Philadelphia, in the county of Philadelphia and State of Pennsylvania, have invented certain new and useful Improvements in Wire Brushes; and I do hereby declare the following to be a full, clear, and exact description of the invention, such as will enable others skilled in the art to which it pertains to make and use it, reference being had to the accompanying drawings, which form part of this specification.

My invention relates to an improvement in wire brushes; and it consists in the peculiar manner of forming the ends of the spines, and the recesses in the washers or body of the brush, whereby the spines will not only hold themselves in position without the use of other fastenings, but will roll in the recesses, and thus be prevented from breaking or being injured, as will be more fully described hereinafter.

The accompanying drawings represent my invention.

*a* represents the handle of the brush, of any length, shape, or size desired, and which is provided with the shoulder *c*, thread *d*, and nut *e* at its brush end, and between this shoulder and nut is clamped the body *g* of the round brush. This body may be built up by a series of washers, one in contact with the other, or be formed in one solid piece, as may be desired. When formed of washers, in one side of each one of them there are drilled, cast, or otherwise formed, a number of circular recesses, 1, a suitable distance inside of the outer edge, but which have a small groove, 2, leading from them through the edge, as shown. Where the body is formed of one piece a number of holes, corresponding to the recesses 1, are made longitudinally through it, and each hole made to communicate with the outer edge by a continuous slot, instead of a small groove.

The spines of the brush are made from springwires or narrow plates 3, which are first bent into the form of staples, and then the doubled edge is so shaped as to form a circular bulge, 4, of just such a size as to fit in the holes or recesses 1, allowing the two free ends to project out through the grooves or slots. Being made of springy material, the ends separate as widely as possible, and expand the bulge so as to fit snugly inside of the hole or recess, and thus each spine is held in position, as the bulge cannot be drawn through the groove or slot.

Not only is the spine held in position without the use of any other fastening device, but each spine can roll or partially turn in its socket, and thus be prevented from breaking or being injured.

Where the body is made from a single piece the spines will project in rows, horizontal to each other; but where it is composed of washers, the spines will project out in single ones all around, in any desired relative position.

Where it is desired to make a rectangular brush, a flat block, 8, is taken, the holes and slots made in its outer side, in the same manner as already described, the spines placed in position, and then the block is placed in a correspondingly shaped recess in the brush-handle, and fastened in position by passing the bolts 9 through from side to side.

Of course the ends of the spines may be enlarged or bulged into any other form desired; but the circular form is the best.

I claim—

In a wire brush, the combination of a body having a number of recesses or holes, 1, grooves 2, and spines 3, having enlarged heads, with a suitable handle, substantially as shown.

In testimony that I claim the foregoing I have hereunto set my hand this 26th day of January, 1877.

JOHN F. HASKINS.

Witnesses:
J. R. MASSEY,
FRANK H. MASSEY.